US012547124B2

(12) United States Patent
Kameda et al.

(10) Patent No.: US 12,547,124 B2
(45) Date of Patent: Feb. 10, 2026

(54) INFORMATION PROCESSING APPARATUS, RECORDING MEDIUM, AND COMPONENT MANAGEMENT METHOD

(71) Applicant: CASIO COMPUTER CO., LTD., Tokyo (JP)

(72) Inventors: Shinichi Kameda, Tokyo (JP); Eriko Miura, Tokyo (JP); Yuki Niino, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 651 days.

(21) Appl. No.: 17/947,310

(22) Filed: Sep. 19, 2022

(65) Prior Publication Data

US 2023/0091091 A1 Mar. 23, 2023

(30) Foreign Application Priority Data

Sep. 22, 2021 (JP) .................................. 2021-154590

(51) Int. Cl.
*G04R 20/26* (2013.01)
*G04G 9/00* (2006.01)
(Continued)

(52) U.S. Cl.
CPC ............. *G04R 20/26* (2013.01); *G04G 9/007* (2013.01); *G04G 9/02* (2013.01); *G04G 21/04* (2013.01)

(58) Field of Classification Search
None
See application file for complete search history.

(56) References Cited

U.S. PATENT DOCUMENTS

| 6,449,219 B1 * | 9/2002 | Hepp | G04G 9/02 368/239 |
| 9,939,788 B2 * | 4/2018 | Ko | G04G 21/08 |
| 10,620,590 B1 * | 4/2020 | Guzman | G06F 3/04817 |

FOREIGN PATENT DOCUMENTS

| EP | 1662343 A2 * | 5/2006 | G04C 10/00 |
| JP | 2009293960 A | 12/2009 | |

(Continued)

OTHER PUBLICATIONS

Term Definitions search—Screenshots (Year: 2025).*

(Continued)

*Primary Examiner* — Regis J Betsch
*Assistant Examiner* — Michael James Walker
(74) *Attorney, Agent, or Firm* — Scully, Scott, Murphy & Presser, P.C.

(57) ABSTRACT

A management server serving as an information processing apparatus includes ROM or RAM that stores programs, and at least one processor executing the stored programs. The processor is configured to execute processing including: acquiring the component information comprising at least one selected from the 24-hour meter or the small clock or the 24-hour meter or the date window or the function display board provided on the board surface of the timepiece, which points a symbol indicating certain information or displays the certain information, and the component image such as the 24-hour meter image or the small clock image or the 24-hour meter image or the date window image or the function display board image corresponding to the component information; and setting the component image which is common to a plurality of types of timepieces by associating the component information with the plurality of types of the timepieces.

18 Claims, 12 Drawing Sheets

(51) Int. Cl.
*G04G 9/02* (2006.01)
*G04G 21/04* (2013.01)

(56) References Cited

FOREIGN PATENT DOCUMENTS

| | | | | |
|---|---|---|---|---|
| JP | 2014181913 | A | | 9/2014 |
| JP | 2015184102 | A | | 10/2015 |
| JP | 2020204544 | A | * | 12/2020 |
| KR | 101686451 | B1 | * | 12/2016 ............. G06F 3/048 |

OTHER PUBLICATIONS

KIPRIS machine translation of KR 101686451 (Year: 2025).*
Espacenet combined translation of JP 2020204544 (Year: 2025).*
Notice of Reasons for Refusal dated Oct. 3, 2023 received in Japanese Patent Application No. JP 2021-154590.

\* cited by examiner

FIG. 1
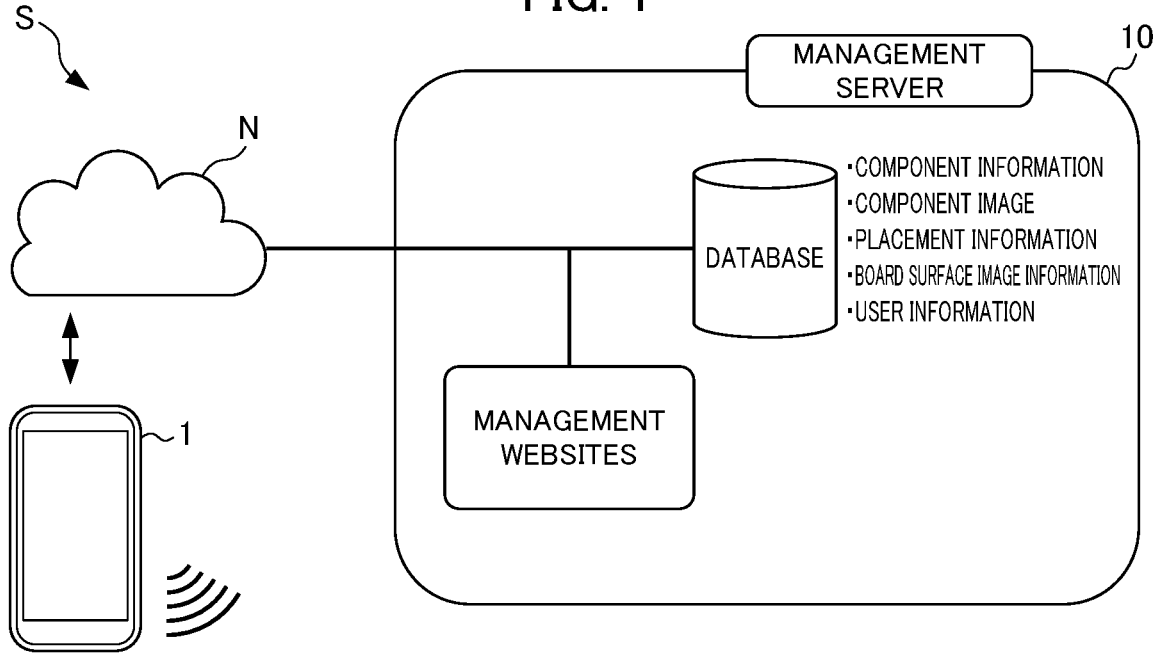
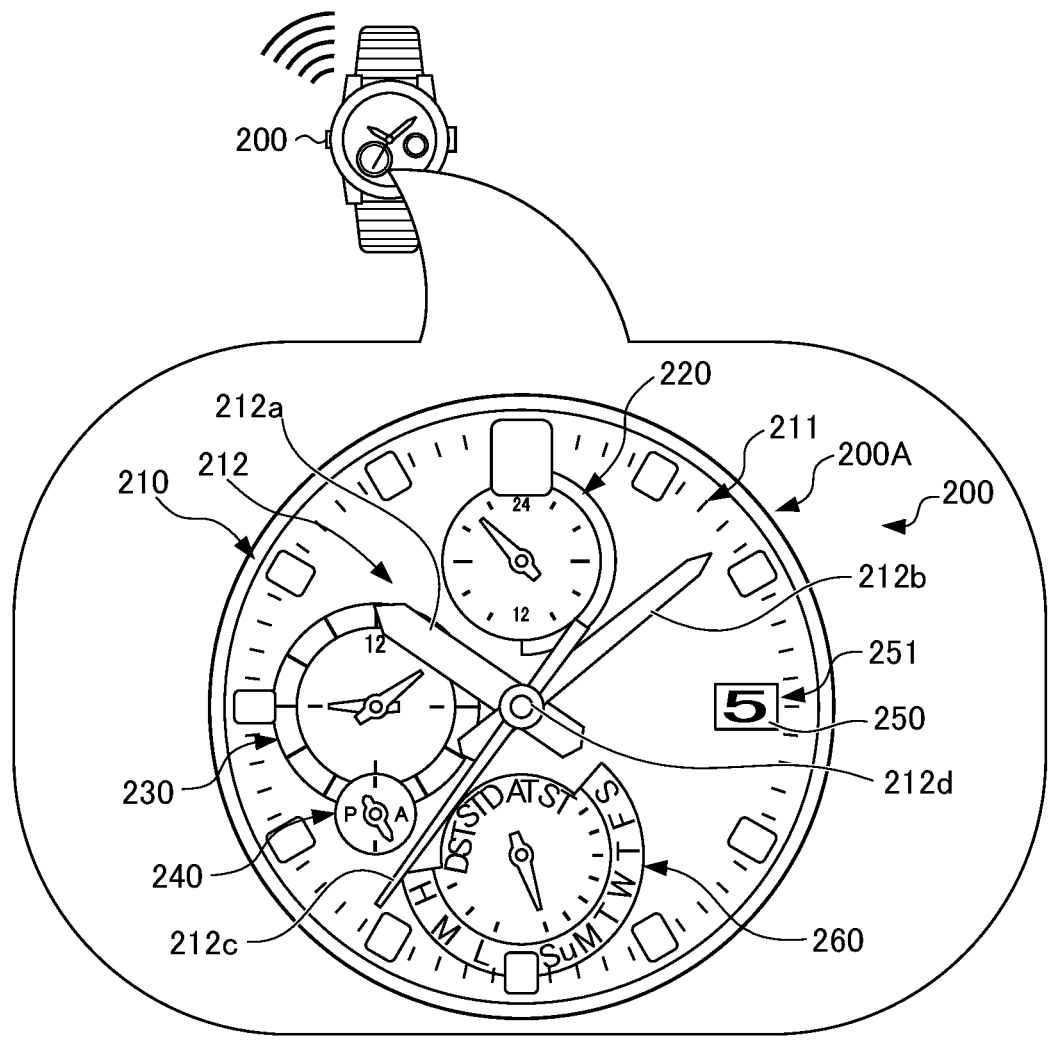

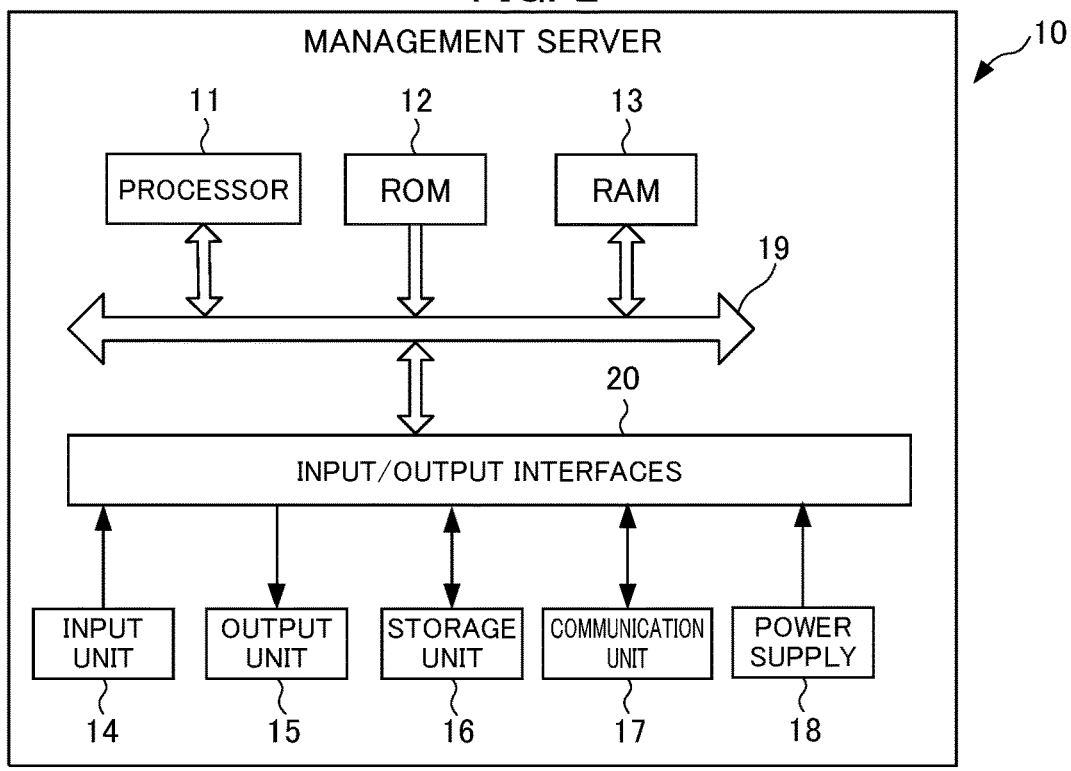
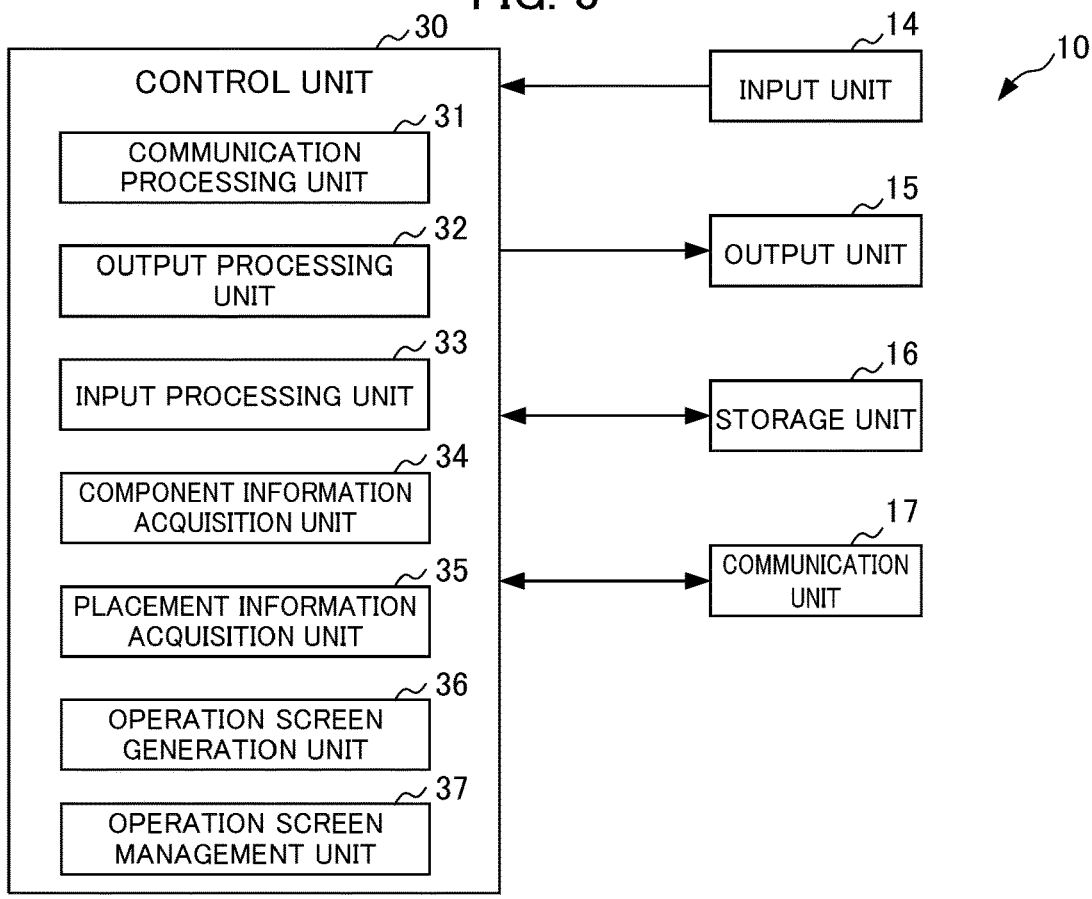

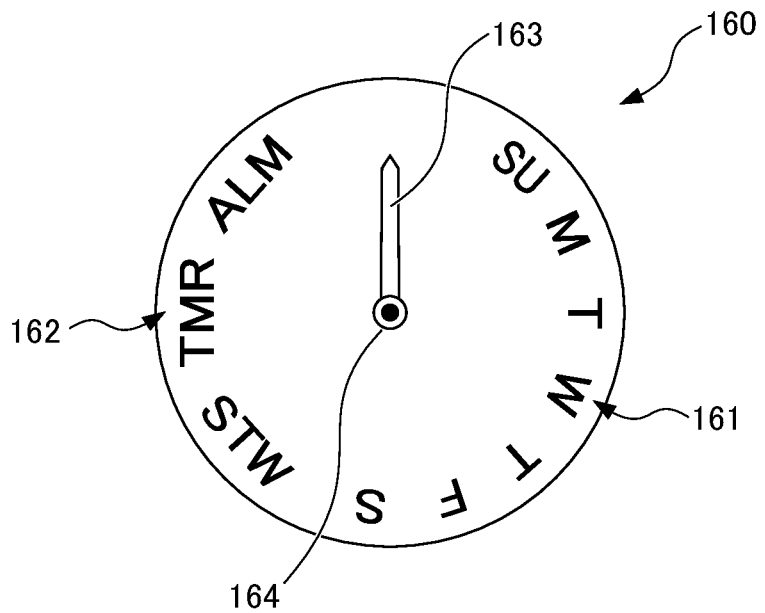
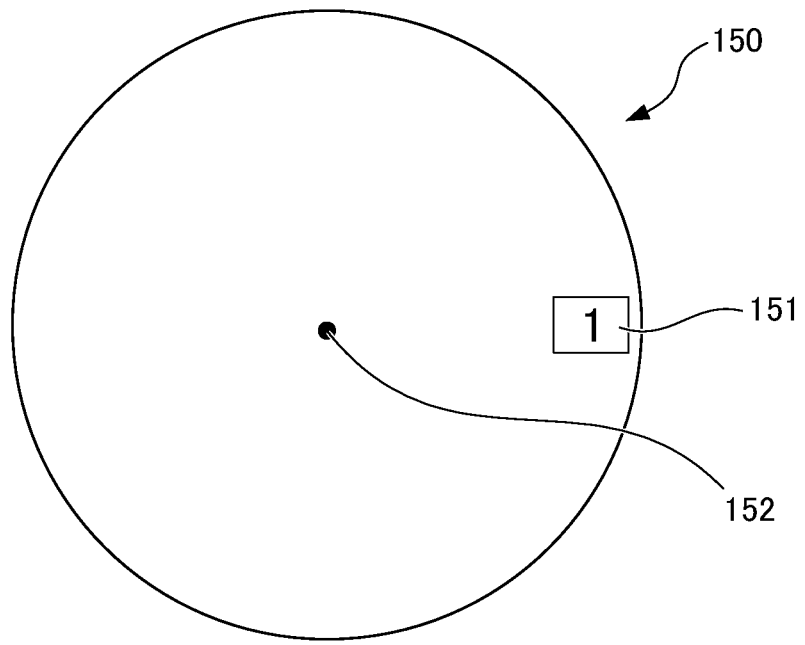

FIG. 13

| 0200 | ANGLE | DISTANCE MAGNIFICATION |
|---|---|---|
| 24-HOUR METER | 0° | 0.5 |
| DT (SMALL CLOCK) | 270° | 0.5 |
| SMALL 24-HOUR METER | DT 180° | DTx1 |
| FUNCTION HAND | 180° | 0.5 |
| FUNCTION HAND REFERENCE | 162° | |
| DATE WINDOW | 90° | 1 |

| 0210 | ANGLE | DISTANCE MAGNIFICATION |
|---|---|---|
| 24-HOUR METER | 0° | 0.6 |
| DT (SMALL CLOCK) | 270° | 0.6 |
| SMALL 24-HOUR METER | DT 180° | DT1.5 |
| FUNCTION DISPLAY BOARD | 180° | 0.6 |
| FUNCTION HAND REFERENCE | 233° | |
| DATE WINDOW | 135° | 1 |

INFORMATION PROCESSING APPARATUS, RECORDING MEDIUM, AND COMPONENT MANAGEMENT METHOD

This application is based on and claims the benefit of priority from Japanese Patent Application No. 2021-154590, filed on 22 Sep. 2021, the content of which is incorporated herein by reference.

BACKGROUND OF THE INVENTION

Field of the Invention

The present disclosure relates to an information processing apparatus, a recording medium, and a component management method.

Related Art

Conventionally, there has been known a technique of adjusting a timepiece using a component image indicating a component of the timepiece. Japanese Unexamined Patent Application, Publication No. 2015-184102 discloses such a technique. Japanese Unexamined Patent Application, Publication No. 2015-184102 discloses an electronic device in which the following processes are executed according to the technique. In these processes, when the electronic device acquires clock time information indicating a time to be displayed by a timepiece from the timepiece using the communication unit, the electronic device displays reference time information and the clock time information indicating a time to be managed on the display unit, and when an instruction to update the clock time information to the reference time information is inputted from the input unit by the user in a state where the reference time information and the clock time information are displayed on the display unit, the electronic device transmits to the timepiece a request to update the clock time information to the reference time information.

SUMMARY OF THE INVENTION

It is an object of the present disclosure to provide an information processing apparatus, a recording medium, and a component management method, capable of efficiently managing a component image corresponding to a component of a timepiece.

In order to achieve the above object, an information processing apparatus according to an aspect of the present disclosure includes a memory that stores programs; and at least one processor that executes the programs stored in the memory, in which the processor is configured to execute processing including acquiring component information comprising at least one component, the component being provided on a board surface of a timepiece, which points a symbol indicating certain information or displays the certain information, and a component image corresponding to the component information; and setting the component image which is common to a plurality of types of timepieces by associating the component information with the plurality of types of timepieces.

BRIEF DESCRIPTION OF THE DRAWINGS

FIG. 1 is a schematic diagram showing the configuration of a timepiece management system to which a management server according to an embodiment of the present disclosure is applied.

FIG. 2 is a block diagram showing the hardware configuration of a management server according to an embodiment of the present disclosure.

FIG. 3 is a functional block diagram showing a functional configuration for executing operation screen generation processing among the functional configurations of the management server shown in FIG. 2;

FIG. 11 is a schematic diagram showing an example of a function display board image.

FIG. 12 is a schematic diagram showing a date window image.

FIG. 13 is a schematic diagram showing an example of a data table of component information relating to the timepiece of FIG. 1.

DETAILED DESCRIPTION OF THE INVENTION

Figure 4:
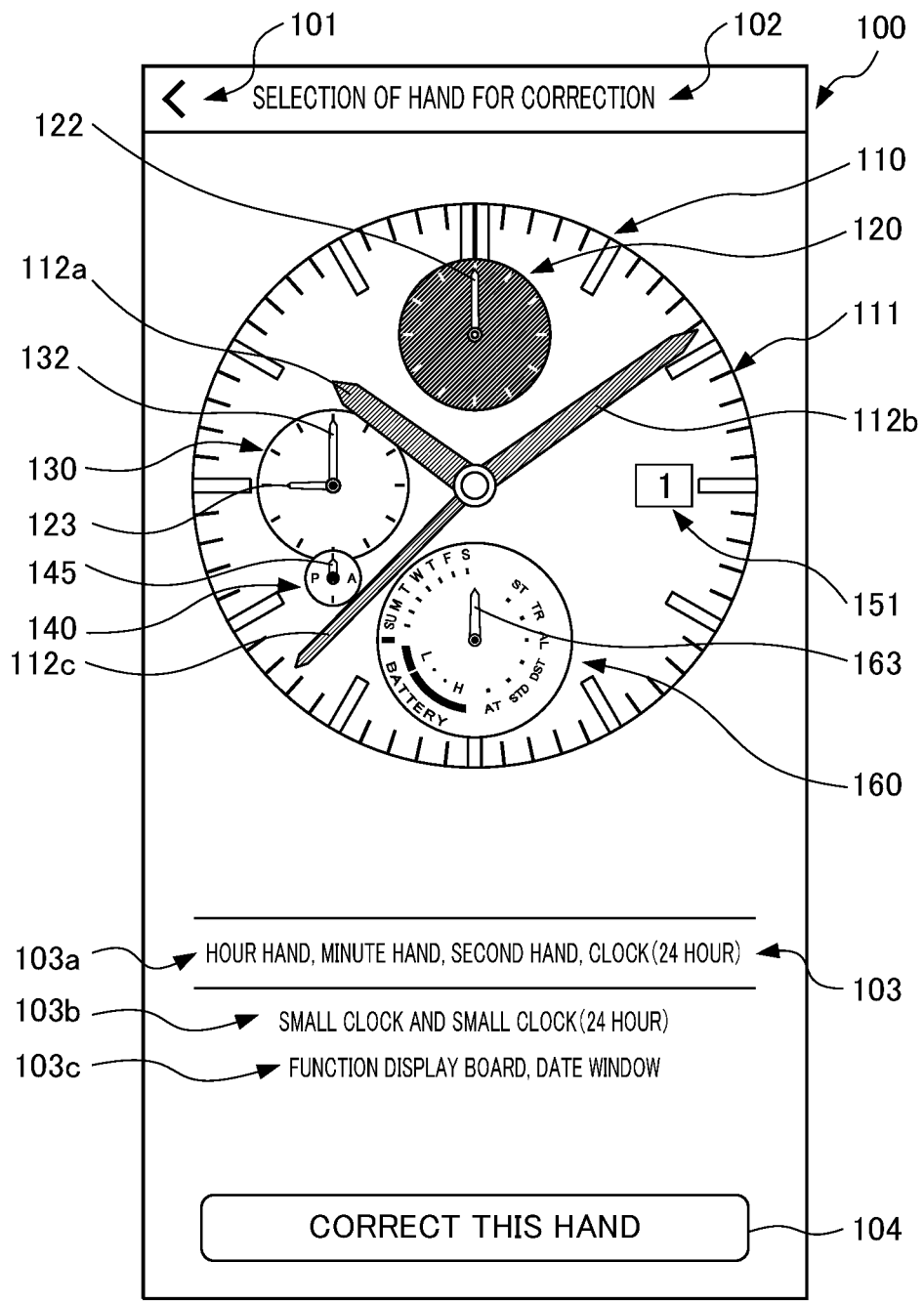
FIG. 4 is a schematic diagram showing an example of an operation screen at the time of pointer correction processing.

Embodiments of the present disclosure will now be described with reference to the drawings.

Watch Management System

An outline of a timepiece management system S will be described. FIG. 1 is a schematic diagram showing a configuration of the timepiece management system S to which a management server 10 according to an embodiment of the present disclosure is applied. The system referred to herein may include not only an overall apparatus configured by a plurality of apparatuses, a plurality of means, and the like, but also a system configured by a single apparatus.

The timepiece management system S realizes operations of a timepiece 200 and the like. The operations of the timepiece 200 include, for example, information management such as specification of an analog timepiece, setting of an alarm, correction of a pointer position, and the like performed from a smartphone via short-range communication. The timepiece management system S may correct a display of a time display screen of a digital timepiece such as a smartwatch, or may perform a setting such as calibration of various sensors.

As shown in FIG. 1, the timepiece management system S according to the present embodiment includes a user terminal 1 and the management server 10. The user terminal 1 and the management server 10 are communicably connected to each other via a network N. The network N is implemented by, for example, the Internet, a LAN (Local Area Network), a mobile phone network, or a combination thereof.

The management server 10 is an information processing apparatus for realizing the timepiece management system S. The management server 10 is implemented by, for example, a computer having a server function.

The user terminal 1 is a portable computer such as a smartphone or a tablet. However, the present configuration is not limited thereto. The user terminal 1 may be a desktop personal computer or a laptop personal computer.

The user terminal 1 according to the present embodiment is communicably connected to the timepiece 200 via short-range communication. The number of user terminals 1 connected to the management server 10 is not limited to one, and a plurality of user terminals 1 may be connected. Furthermore, the user terminal 1 can perform short-range communication with a plurality of watches 200. The details of the user terminal 1 will be described later.

The timepiece 200 according to the present embodiment is, for example, an analog timepiece. The analog timepiece can communicate with the user terminal 1 by short-range wireless communication such as Bluetooth (registered trademark). As shown in FIG. 1, the timepiece 200 includes a main clock 210. The main clock 210 includes a base 211, an hour hand 212a, a minute hand 212b, and a second hand 212c. The base 211 includes a scale placed on a board surface 200A along the outline of the board surface 200A. The hour hand 212a, the minute hand 212b, and the second hand 212c are rotatably provided on a pointer shaft 212d at the center of the board surface 200A. Rotation in the description herein indicates rotation in only one direction, either clockwise or counter-clockwise, or bidirectional rotation.

Furthermore, the timepiece 200 includes a plurality of sub board surfaces on the board surface 200A. The plurality of sub board surfaces include a 24-hour meter 220 that is linked to the main clock 210, a small clock 230, a 24-hour meter 240 that is linked to the small clock 230, a date window 251, and a function display board 260. Furthermore, the sub board surface of the timepiece 200 is not limited thereto. For example, the timepiece 200 may include a sub board surface of a function display window for displaying a city name or the like. Furthermore, the timepiece 200 may have a digital sub board surface for displaying a time, a city name, and the like.

In the present embodiment, the hour hand 212a, the minute hand 212b, and the second hand 212c are referred to as a main hand 212. The small clock 230 displays a world time or a dual time. The 24-hour meter 240 is a 24-hour meter relating to the small clock 230.

Furthermore, the date window 251 is an opening which opens on the board surface 200A. A portion of a date indicator displayed on a calendar 250 provided therein is exposed to the outside through the opening. Thus, the user can confirm the date. The function display board 260 displays various display forms such as day of the week, a current mode of the timepiece 200, a battery remaining amount display, and a stop watch depending on the type of the timepiece 200.

The function display window is an opening which opens on the board surface 200A. A portion of a display unit displaying, for example, a function on an internal disk-shaped disk is exposed to the outside through the opening. Thus, the user can confirm the display contents. The display unit of the function display window displays a city name, a function, etc., such as a city name of a world time displayed by the small clock. The display unit of the disc varies depending on the type of timepiece 200.

The timepiece 200 includes a motor (not shown) for driving the pointer, and a control unit (not shown) for controlling the operation of the motor. It is possible for the control unit of the timepiece 200 to control the motor based on the setting information of the pointer position transmitted from the user terminal 1 to drive the pointer. The setting information is generated by pointer correction processing of the user terminal 1, which will be described later. The setting information is information of a pointer as a correction target and information of a rotation amount necessary for correction. The reference position of the pointer is a predetermined position as a reference of the pointer rotating or revolving. For example, in a case of the main hand, the position indicating 0 o'clock is set in advance as a reference position of the pointer.

A pointer of an analog timepiece may be displaced from its original position due to impact, magnetic force, or the like. Therefore, it is necessary to correct the pointer of the timepiece. However, according to the timepiece management system S of the present embodiment, the timepiece 200 can automatically perform the pointer correction by transmitting the setting information generated by the user terminal 1 to the timepiece 200 via the short-range communication.

Management Server

Next, an example of the management server 10 will be described. FIG. 2 is a block diagram showing a hardware configuration of the management server 10 according to an embodiment of the present disclosure.

As shown in FIG. 2, the management server 10 includes a processor 11, ROM (Read Only Memory) 12, RAM (Random Access Memory) 13, an input unit 14, an output unit 15, a storage unit 16, a communication unit 17, a power supply unit 18, a bus 19, and an input/output interface 20.

The processor 11 is a central portion of a computer that performs processing such as calculation and control necessary for the operation of the management server 10. The processor 11 performs various calculations and processing. The processor 11 is, for example, a CPU (Central Processing Unit), an MPU (Micro Processing Unit), an SoC (System on a Chip), a DSP (Digital Signal Processor), a GPU (Graphics Processing Unit), an ASIC (Application Specific Integrated Circuit), a PLD (Programmable Logic Device) or a FPGA (Field-Programmable Gate Array). Alternatively, the processor 11 may be a combination of a plurality of these. Furthermore, the processor 11 may be a combination of a hardware accelerator or the like with these.

The processor 11 controls each unit to realize various functions of the management server 10 based on firmware, system software, and programs such as and application software recorded in the ROM 12 or the RAM 13. Furthermore, the processor 11 executes processing described later based on a program. A part or all of the program may be incorporated in a circuit of the processor 11.

The processor 11, the ROM 12, and the RAM 13 are connected to each other via the bus 19. The input/output interface 20 is also connected to the bus 19. The input unit 14, the output unit 15, the storage unit 16, the communication unit 17, and the power supply unit 18 are connected to the input/output interface 20.

The input unit 14 and the output unit 15 are user interfaces that are electrically connected to the input/output interface 20 by wire or wirelessly. The input unit 14 includes, for example, a keyboard, a mouse, various buttons, and a microphone. The input unit 14 inputs various kinds of information in accordance with an instruction operation by a user. The output unit 15 includes, for example, a display for displaying a management screen of the timepiece management system S, a speaker for amplifying sound, and the like, and outputs images and sounds.

The storage unit 16 includes semiconductor memory such as DRAM (Dynamic Random Access Memory), and stores various data of the management server 10. A plurality of databases for the timepiece management system S are constructed in the storage unit 16. For example, as shown in FIG. 1, a database related to a timepiece and a user registered in the timepiece management system S is constructed in the storage unit 16.

The communication unit 17 is a device for performing communication with another device (not shown) via a network including the Internet. The communication unit 17 may be a device for performing short-range communication without a network.

The power supply unit 18 can supply power to each unit of the management server 10 by being connected to an external power supply.

Next, the functional configuration of the management server 10 will be described. FIG. 3 is a functional block diagram showing a functional configuration for executing operation screen generation processing among the functional configurations of the management server 10 shown in FIG. 2. The operation screen generation processing includes processing of generating an operation screen for performing operation of the pointer correction processing of the timepiece management system S. The operation screen is a user interface for operating the timepiece, and the details thereof will be described later.

The control unit 30 that performs various kinds of control of the management server 10 is a processing unit implemented by the processor 11 that executes arithmetic processing. The control unit 30 of the present embodiment includes a communication processing unit (communication processing function) 31, an output processing unit (output processing function) 32, an input processing unit (input processing function) 33, a component information acquisition unit (component information acquisition function) 34, a placement information acquisition unit (placement information acquisition function) 35, an operation screen generation unit (operation screen generation function) 36, and an operation screen management unit (operation screen management function) 37.

The communication processing unit 31 executes processing for communicating with an external device via the communication unit 17. For example, the communication processing unit 31 executes processing for sending and receiving various kinds of information to and from the user terminal 1 connected to the management server 10 via the communication unit 17.

The output processing unit 32 executes processing for displaying an image on the screen of the output unit 15 of the management server 10. For example, the output processing unit 32 executes processing of displaying a management screen for management of the timepiece management system S on the screen of the output unit 15.

The input processing unit 33 executes processing for receiving an operation of the input unit 14 by an administrator of the management server 10. For example, the input processing unit 33 executes processing of receiving an operation for managing the timepiece management system S. The operation for managing the timepiece management system S is an operation inputted to the input unit 14 by the administrator based on the information displayed on the screen of the output unit 15.

The component information acquisition unit 34 acquires component information stored in the storage unit 16. The component information includes information for specifying a component image, parts, and the like corresponding to a sub board surface as a component. For example, the component information includes interlocking component information indicating that the hour hand 212a and the minute hand 212b operate in conjunction with each other, a storage location of a corresponding component image, and the like. In the timepiece, display of a pointer, a date window, or the like and digital display of a digital sub-display board surface are associated with each other according to specifications. For example, in a case in which the specification of the timepiece is a specification in which a digital display indicating country information and a pointer indicating time are interlocked with each other, when the digital display is corrected, the pointer moves in association with each other. The interlocking component information includes information relating to a position of a pointer possessed by one other component and indicating information or a digital display indicating information, and a position of a pointer indicating information in conjunction with a change of a display such as a date window, or a component in a relationship in which a digital display indicating information and a display such as a date window change. For example, the interlocking component information includes rotation ratio information indicating a rotation ratio of components that are in interlocking rotation relation. In the rotation ratio information, the rotation amount of the component with respect to a predetermined operation amount in the board surface image 110 is set based on the rotation ratio. Furthermore, the interlocking component information includes information relating to the position of the pointer and the amount of rotation in association with the display content of the digital display on the digital sub board surface.

Furthermore, the component information is set for each type of the timepiece 200, and includes information such as information on the presence or absence of various sub board surfaces and the number of steps which are information on movement of the pointer during the pointer correction processing. The number of steps refers to an amount related to a change in the position or display of the sub board surface per cycle as a constant period.

The placement information acquisition unit 35 acquires placement information indicating the position of the component specified by the component information. By combining the component information and the placement information, the position of the component in the board surface image is specified.

The operation screen generation unit 36 arranges the component images such as the sub board surface and the pointer stored in the storage unit 16 based on the component information acquired by the component information acquisition unit 34 to generate the board surface image. The operation screen generation unit 36 performs processing of generating an operation screen based on the board surface image.

The operation screen management unit 37 executes processing of storing the operation screen generated by the operation screen generation unit 36 in the storage unit 16, and processing of reading and outputting the operation screen requested from the storage unit 16 in response to a request from the user terminal 1.

Next, the board surface image 110 will be described with reference to FIG. 4. In the present embodiment, the board surface of the timepiece 200 as an operation target may be greatly different depending on the type of the timepiece 200, and a board surface image may be created for each timepiece based on the component information in order to improve operability and visibility.

The board surface image 110 is an image simulating the board surface of the timepiece 200 serving as a target for pointer correction. In the present embodiment, the outline of the board surface image 110 is substantially circular, and the board surface image 110 is used even when the outline of the timepiece 200 is not substantially circular. However, the outline of the board surface image 110 is not limited to a substantially circular shape, and the shape is not limited particularly. For example, the outline of the board surface image 110 may be an elliptical shape or a substantially polygonal shape.

In addition, various pointers and sub board surfaces according to the specification of the timepiece 200 are displayed in the board surface image 110. In the example of FIG. 4, the board surface image 110 displays, as component images, a base image 111 having a scale or the like, an hour hand image 112*a*, a minute hand image 112*b*, a second hand image 112*c*, a 24-hour meter image 120, a small clock image 130, a 24-hour meter image 140 serving as a 24-hour meter of a small clock, a date window image 151, and a function display board image 160.

Figure 6:
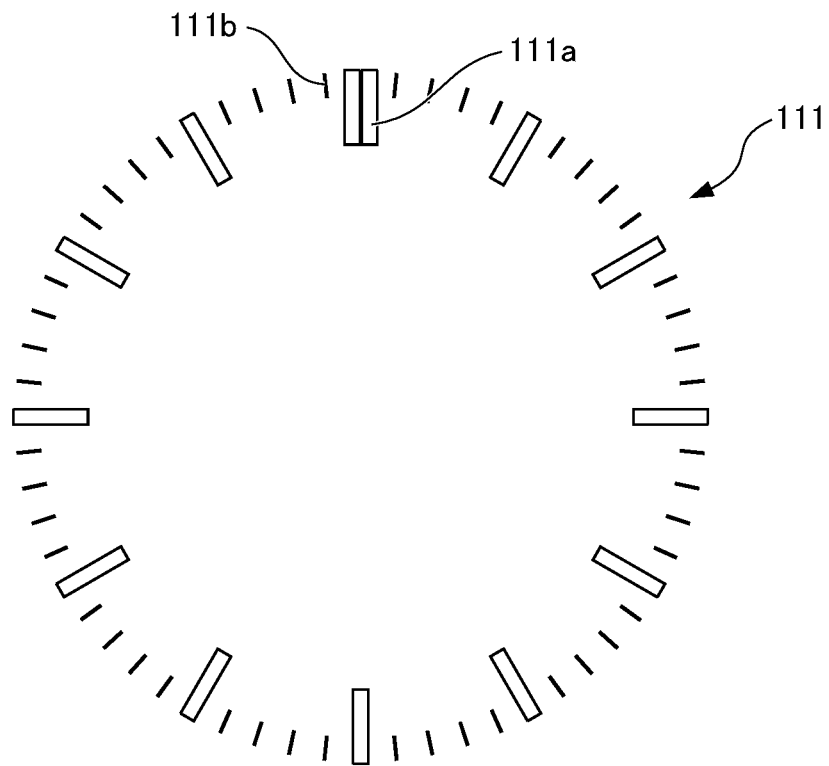
FIG. 6 is a schematic diagram showing a base image.
Figure 7:
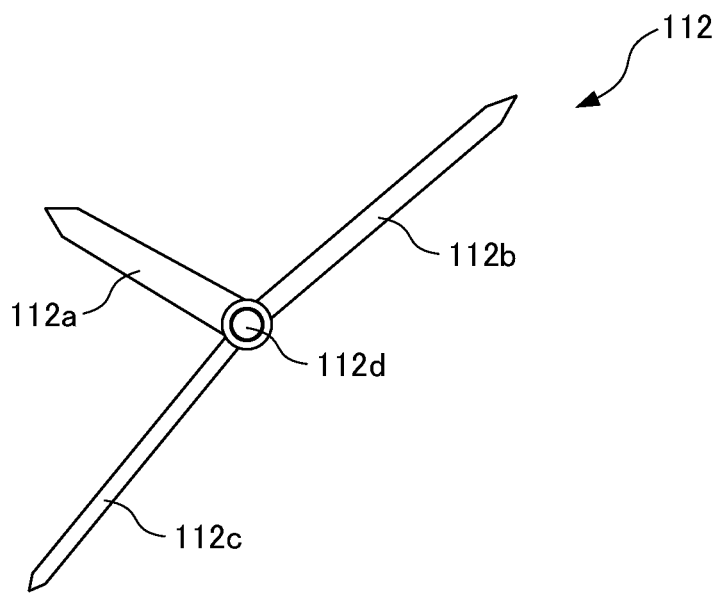
FIG. 7 is a schematic diagram showing a main hand image.

In the timepiece management system S according to the present embodiment, the board surface image 110 is generated by combining the base image 111 and the main hand image 112 shown in FIGS. 6 and 7, with the component images such as the sub board surfaces and the pointers shown in FIGS. 8 to 12. The component images are not limited to the images of the analog sub board surface shown in FIGS. 8 to 12, and may be an image of the digital sub board surface. That is, a liquid crystal or the like capable of displaying digital information may be set as a common image. For example, an image of a digital sub board surface is an image of a liquid crystal capable of displaying information digitally. Furthermore, in the timepiece management system S, the component image does not include any component such as a logo mark or decoration on a dial that does not need to be particularly adjusted, but may include any component image of them.

Furthermore, in the present embodiment, all of the component images such as the sub board surface and the pointer are common except for the function display board and the function hand. Therefore, in the timepiece management system S according to the present embodiment, the capacity of the image data can be reduced, and the processing for generating the operation screen can be simplified.

However, the present disclosure is not limited to this, and all the component images may be made common, or a component image of a unique sub board surface may be prepared for a specific type of timepiece as necessary. Furthermore, in the timepiece management system S, in a case in which all of the managed timepieces are divided into a plurality of groups based on the brand, the board surface shape, etc., for example, a common board surface image may be set for each group. Furthermore, the board surface image common to each of the groups may be substantially the same or different among the groups. Even in this case, the number of board surface images can be reduced, and the capacity of the image data can be reduced and the processing can be simplified.

Furthermore, in the timepiece management system S, in a case in which all the managed timepieces are divided into a plurality of groups based on the brand, the board surface shape, etc., a base image, a main hand image, a component image such as a sub board surface, a pointer, or the like common to each group may be set for each group. Furthermore, the base image, the main hand image, and the component images such as the sub board surface, the pointer, etc., which are common to the group of each group, may be substantially the same or different among the groups. Even in this case, the number of board surface images can be reduced, and the capacity of the image data can be reduced and the processing can be simplified.

As shown in FIG. 6, the base image 111 is an image including a plurality of large scale displays 111*a* and a plurality of small scale displays 111*b* regularly placed in an annular shape, and the scale displays 111*a* and 111*b* correspond to hands of the main hand image 112 described later. As shown in FIG. 7, the main hand image 112 is an image including an hour hand image 112*a*, a minute hand image 112*b*, a second hand image 112*c*, and a pointer shaft image 112*d* provided at the rotation center of them. On the screen of the user terminal 1 according to the present embodiment, it is possible to display the main hand image 112 by rotating the hour hand image 112*a*, the minute hand image 112*b*, and the second hand image 112*c* with the pointer shaft image 112*d* as the rotation center.

Figure 8:
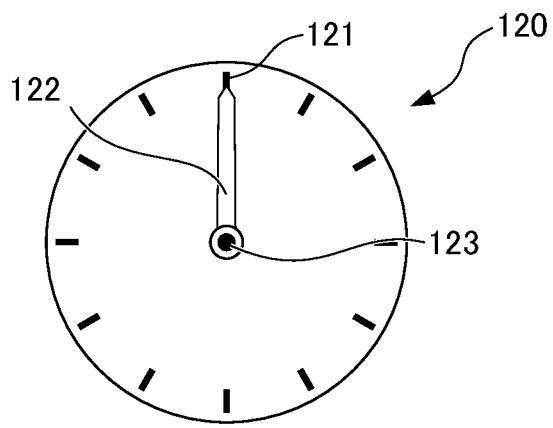
FIG. 8 is a schematic diagram showing a 24-hour meter image.

Next, as shown in FIG. 8, the component image of the 24-hour meter image 120 is an image including a plurality of scales 121 indicating time, a 24-hour meter image 122, and a pointer shaft image 123 provided at the rotation center of the 24-hour meter image 122. It is possible for the user terminal 1 according to the present embodiment to rotate and display the display of the hand image 122 for 24-hours with the pointer shaft image 123 as the rotation center on the operation screen 100.

Figure 9:
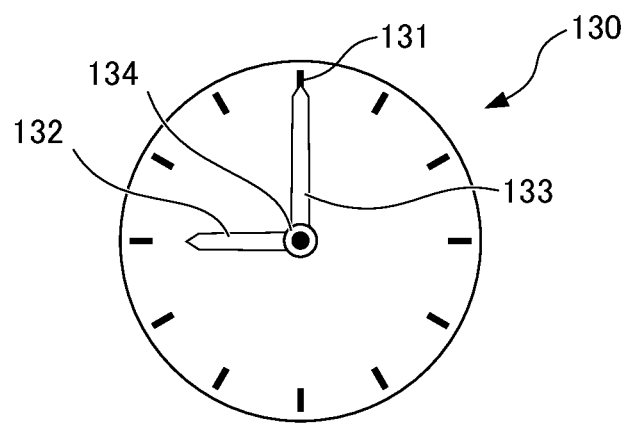
FIG. 9 is a schematic diagram showing a small clock image.

Next, as shown in FIG. 9, the component image of the small clock image 130 is an image including a plurality of scales 131 indicating time, a small hour hand image 132, a small minute hand image 133, and a pointer shaft image 134 provided at the rotation center of each hand. On the operation screen 100 of the user terminal 1 according to the present embodiment, it is possible to display the small hour hand image 132 and the small minute hand image 133 while rotating the small hour hand image 132 and the small minute hand image 133 independently of each other with the pointer shaft image 134 as the rotation center.

Figure 10:
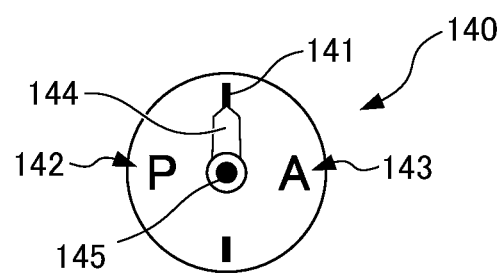
FIG. 10 is a schematic diagram showing a small 24-hour meter image.

As shown in FIG. 10, the component image of the small 24-hour meter image 140 is an image including a scale display 141 indicating time, a display 142 indicating PM, a display 143 indicating AM, a PA hand image 144 serving as a small 24-hour hand, and a pointer shaft image 145 provided at the rotation center of the PA hand image 144. The user terminal 1 according to the present embodiment can rotate and display the PA hand image 144 with the pointer shaft image 145 as the rotation center on the operation screen 100.

FIG. 11 is a diagram showing an example of a function display board image. As shown in FIG. 11, the function display board surface image 160 is an image including a day of the week display 161, a function display 162, a function hand image 163, and a pointer shaft image 164 provided at the rotation center of the function hand image 163. The user terminal 1 according to the present embodiment can rotate and display the function hand image 163 with the pointer shaft image 164 as the rotation center on the operation screen 100. Since the function display board image 160 varies depending on the function of the timepiece 200, the function display board image 160 varies depending on the timepiece having the function display board 260. When different types of watches have substantially the same function, a common image may be used as the function display board image 160.

In a calendar image 150, as shown in FIG. 12, a date window image 151 is displayed inside the outline of the calendar image 150. The user terminal 1 according to the present embodiment can rotate and display the calendar image 150 with the center 152 as the rotation center on the operation screen 100.

In the timepiece management system S according to the present embodiment, when new component information is stored in the storage unit 16, the management server 10 performs operation screen generation processing of automatically generating a board surface image based on the placement information indicating the placement of the sub board surface on the board surface and the component image of the sub board surface to generate an operation screen. In the present embodiment, since the outline of the board surface image 110 is substantially circular, and the component information is placed in the outline of the board surface image 110, the position is represented by a numerical value related to an angle and a distance such as a polar coordinate so that enlargement and reduction are easier than for Cartesian coordinates.

For example, the coordinates in the board surface image 110 are determined in advance with the rotation center of the main hand image 112 as the origin, the direction directly above the origin as 0° the reference direction, and the clockwise direction as positive. The pointer shaft image 112*d* serving as the rotation center of the main hand image 112 is provided at the center of the outline of the board surface image 110. In the coordinates, the position of the component information is represented by an angle between the reference direction and the direction from the origin to the component information, and a distance magnification as a numerical value relating to the distance.

The distance magnification refers to the ratio of the distance from the origin to the component information when the radius of the outline of the board surface image 110 is 1. For example, the distance magnification is 1 when the component information is on the outline of the board surface image 110, 0.5 when the component information is at a position half the radius of the board surface image 110, and 2 when the component information is at a position double the radius of the board surface image 110. However, the numerical value relating to the distance is not limited thereto. For example, the numerical value relating to the distance may be a numerical value of an actual distance from a predetermined origin. The placement information includes origin information indicating the position of the set origin.

In the operation screen generation processing of generating the operation screen, the management server 10 generates the board surface image based on the placement information indicating the placement of the sub board surface and the like on the board surface and the component image of the sub board surface. However, the present disclosure is not limited thereto, and the generation of the image may be defined based on the actual board surface of a timepiece. For example, the control unit 30 of the management server 10 may acquire a photographic image of the board surface of a timepiece captured from the user terminal 1, analyze the photographic image, calculate the placement information, and generate the board surface image. Even in this case, the placement of the rotation shafts of the pointers in the board surface image can be set so as to follow the actual board surface of the timepiece, such that the management server 10 can generate a board surface image that can be easily understood by the user.

Next, the operation screen generation processing executed by the management server 10 according to the present embodiment will be described. The operation screen generation processing refers to processing of generating a board surface image for a timepiece operation included in the operation screen used in the hand correction process by the timepiece management system S, and generating an operation screen by placing the board surface image for a timepiece operation and other images other than the board surface image for a timepiece operation such as buttons and options.

The other images are common regardless of the type of the timepiece 200, for example. The other images are stored in the storage unit 16 of the management server 10, read at the timing of the operation screen generation processing, and used for generation of the operation screen together with the generated board surface image.

In the present embodiment, as described above, the operation screen 100 is stored in the storage unit 16 in such a manner that component images such as the sub board surface and the pointer selected according to the type of the timepiece 200 are generated and placed by the operation screen generation processing described later in the management server 10. When the user terminal 1 executes the pointer correction processing, the operation screen 100 is transmitted from the management server 10 to the user terminal 1 and used for the pointer correction processing.

Furthermore, the user terminal 1 according to the present embodiment stores the operation screen 100 used after the pointer correction processing in the storage unit of the user terminal 1 so that the screen can be used for the next and subsequent pointer correction processing. However, the present disclosure is not limited thereto, and the user terminal 1 may delete the operation screen 100 used after the pointer correction processing.

Next, an example of the operation screen will be described with reference to FIG. 4. The operation screen 100 includes the board surface image 110 and other images for a pointer correction operation, and the like. In FIG. 4, a button 101 for shifting to another screen of the timepiece management system S and a display 102 for displaying an operation performed by the user are displayed on the upper portion of the operation screen 100. The board surface image 110 is displayed below the button 101 and the display 102 on the operation screen 100.

A pointer selection menu 103 as a correction target is displayed below the board surface image 110 on the operation screen. On the pointer selection menu 103, options 103*a*, 103*b*, and 103*c* are displayed in this order from above. In the option 103*a*, "hour hand, minute hand, second hand, hour hand (24-hour)" is displayed. In the option 103*b*, "small clock, small clock (24-hour)" is displayed. In the option 103*c*, the option "function display board, date window" is displayed. The option sandwiched by two horizontal lines is indicated as an option selected by the user, and in FIG. 4, the option 103*a* is selected.

A button 104 indicating "correct this hand" is displayed below the pointer selection menu 103. When the button 104 is pressed in a state in which an option is selected in the pointer selection menu 103, the screen shifts to the screen of the correction operation shown in FIG. 5.

In the present embodiment, although the color of the pointer is white as described later, the pointer in FIG. 4 and FIG. 5 described later is displayed in a colored manner. The color of the pointer selected on the operation screen 100 is changed in order to make it easy for the user to recognize the pointer selected on the pointer selection menu 103. The selected pointer is not limited to a change in color display, but may be changed in size or an animation with motion. Furthermore, the selected pointer may be easily recognized by changing the display of pointers other than the selected pointer.

Next, the operation screen 100 for performing the correction operation shown in FIG. 5 will be described. In the upper part of the operation screen 100 of FIG. 5, the button 101 for shifting to another screen of the timepiece management system S and the display 102 for displaying an operation performed by the user are displayed.

In addition, below the button 101 and the display 102, a board surface image 110 simulating a timepiece is displayed in the same manner as in FIG. 4. A counter-clockwise button 106 and a clockwise button 105 are displayed on the left and right sides, respectively, below the board surface image 110. The counter-clockwise button 106 can move the hand of the selected pointer counter-clockwise by a predetermined step when pressed. When the clockwise button 105 is pressed, the hand of the selected pointer can be moved clockwise by a predetermined step. If the clock as an operation target does not rotate the pointer counter-clockwise, the counter-clockwise button 106 may not be displayed.

Figure 5:
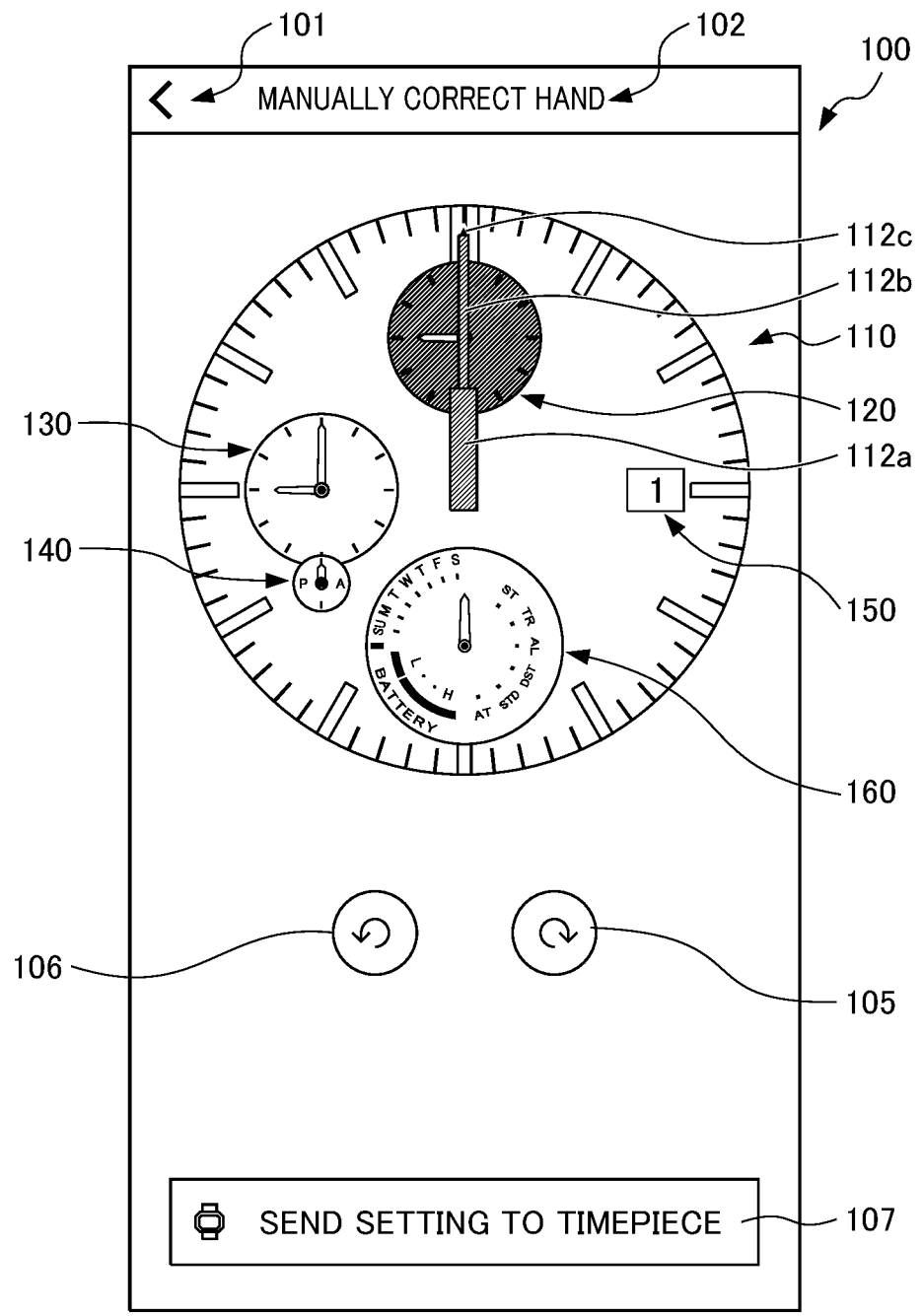
FIG. 5 is a schematic diagram showing an operation screen after a correction target is set in the operation screen of FIG. 4.

Furthermore, as in the example of FIG. 4, when a plurality of interlocking pointers are selected, by further selecting any one of the interlocking pointers, a pointer to be moved can be selected by pressing the counter-clockwise button 106 or the clockwise button 105. Furthermore, the pointer that is interlocked to the further selected pointer moves in conjunction with the selected pointer based on the interlocking component information by moving the selected pointer. Furthermore, although the management server 10 according to the present embodiment changes the color display of the pointer selected on the operation screen 100, when the pointer is further selected from the plurality of selected interlocking pointers, the color display of the pointers other than the selected pointer may not be changed.

The number of predetermined steps varies depending on timepieces. In the component information stored in the storage unit 16 of the management server 10, the number of steps per cycle of each pointer is stored for each timepiece, and the rotation amount per step is determined based on the number of steps per cycle. The management server 10 calculates the amount of rotation in one step based on the component information. For example, since the number of steps per cycle of the second hand is 60 and one cycle is 360°, the rotation amount per step is 6°.

Below the counter-clockwise button 106 and the clockwise button 105, a button 107 indicating that "Send Setting to Timepiece" is displayed. In the user terminal 1 according to the present embodiment, when the pointer as a correction target is determined on the operation screen 100 in FIG. 4, an operation of moving the pointer as a correction target to the reference position is performed on the timepiece 200, and the position of the pointer as a correction target on the board surface of the operation screen 100 is moved to the reference position. At this time, the pointer of the timepiece 200 does not indicate the reference position because a shift has occurred.

The user presses the counter-clockwise button 106 and the clockwise button 105 so that the pointer as a correction target on the operation screen matches the position of the shifted pointer as a correction target in the timepiece 200. Next, when the button 107 is pressed in a state where the position of the pointer as a correction target of the timepiece 200 as a correction target and the position of the pointer as a correction target on the board surface of the operation screen 100 coincide with each other, setting information is generated, and the setting information is transmitted to the timepiece 200 via short-range communication. The timepiece 200 corrects the shift of the pointer based on the received setting information. The setting information includes information on the pointer as a correction target and information on the number of steps in which the pointer as a correction target is moved from the reference position on the operation screen by the user's operation.

In the operation screen generation processing, the base image 111 and the main hand image 112 are placed such that the centers of the base image 111 and the main hand image 112 coincide with the center of the board surface.

When the timepiece as a correction target does not have any of the hour hand, minute hand, and second hand, all of the hour hand image 112a, the minute hand image 112b, and the second hand image 112c may not necessarily be displayed in the component image of the main hand image 112.

The 24-hour meter image 120, the small clock image 130, the function display board image 160, and the date window image 151 are placed such that the center of the sub board surface comes to a position designated by the placement information included in the component information in the coordinates on the board surface.

Furthermore, in the present embodiment, since the small 24-hour meter image 140 is a 24-hour meter related to the small clock, the placement of the small 24-hour meter image 140 is determined based on the small clock image 130. For example, the position of the small 24-hour meter image 140 is represented by the coordinates when the center of the circle of the outline of the small clock image 130 is the origin, the direction directly above the center of the circle is 0°, the radius of the circle is 1, and the clockwise direction is positive. The small 24-hour meter image 140 is placed such that the center of the small 24-hour meter image 140 coincides with a position specified from the component information in the coordinates.

Next, generation of an operation screen of the timepiece 200 will be described with reference to FIGS. 1, 13, and 14. As shown in FIG. 1, the timepiece 200 includes the hour hand 212a, the minute hand 212b, the second hand 212c, the 24-hour meter 220, the small clock 230, the 24-hour meter 240, the function display board 260, and the date window 251 on the board surface 200A.

With the management server 10, an administrator performs an input operation of the component information such as the placement information and the component image related to each hand and each sub board surface of the timepiece 200, and stores the information in the data table of the component information in the storage unit 16 as shown in FIG. 1. When the storage unit 16 of the management server 10 stores the component information of the timepiece 200, the management server 10 starts the operation screen generation processing.

As described above, the base image 111 and the main hand image 112 are placed such that their centers coincide with the origin of the board surface image 110. Since the data table of the placement information shown in FIG. 13 is inputted with an angle of 0° and a distance magnification of 0.5, the 24-hour meter 220 is placed such that the center of the 24-hour meter image 120 coincides with a position of 0.5 times the distance from the origin to the outline in a directly up direction when viewed from the origin in the coordinate on the board surface image 110. Similarly, the placements of the small clock image 130, the function display board image 160, and the date window image 151 are determined for the small clock 230, the function display board 260, and the date window 251.

In the present embodiment, the reference for positioning the date window 251 is set at the center of the date window 251. However, the present disclosure is not limited thereto. For example, when the shape of the outline of the date window is substantially quadrangular, the reference for positioning the date window 251 may be at any position of the four corners or may be appropriately provided.

In the data table shown in FIG. 13, an angle of DT180° and a distance magnification of DT×1 are inputted for the small 24-hour meter 240. DT denotes a small clock, and DT180° denotes a position obtained by rotating the center of the circle of the outline of the small clock clockwise by 180° from an angle directly up as seen from the center of the circle of the outline of the abovementioned small clock. DT×1 indicates that the distance magnification with respect to the radius of the outline of the small clock is 1.

That is, DT×1 indicates that it is on the outline of the small clock. Therefore, the placement of the small 24-hour meter image 140 is determined such that the center of the small 24-hour meter image 140 coincides with the position where the small 24-hour meter image 140 is rotated about the center of the small clock image 130 by 180° clockwise from the direction directly above the center of the small clock image 130 on the outline of the small clock image 130.

Figure 14:
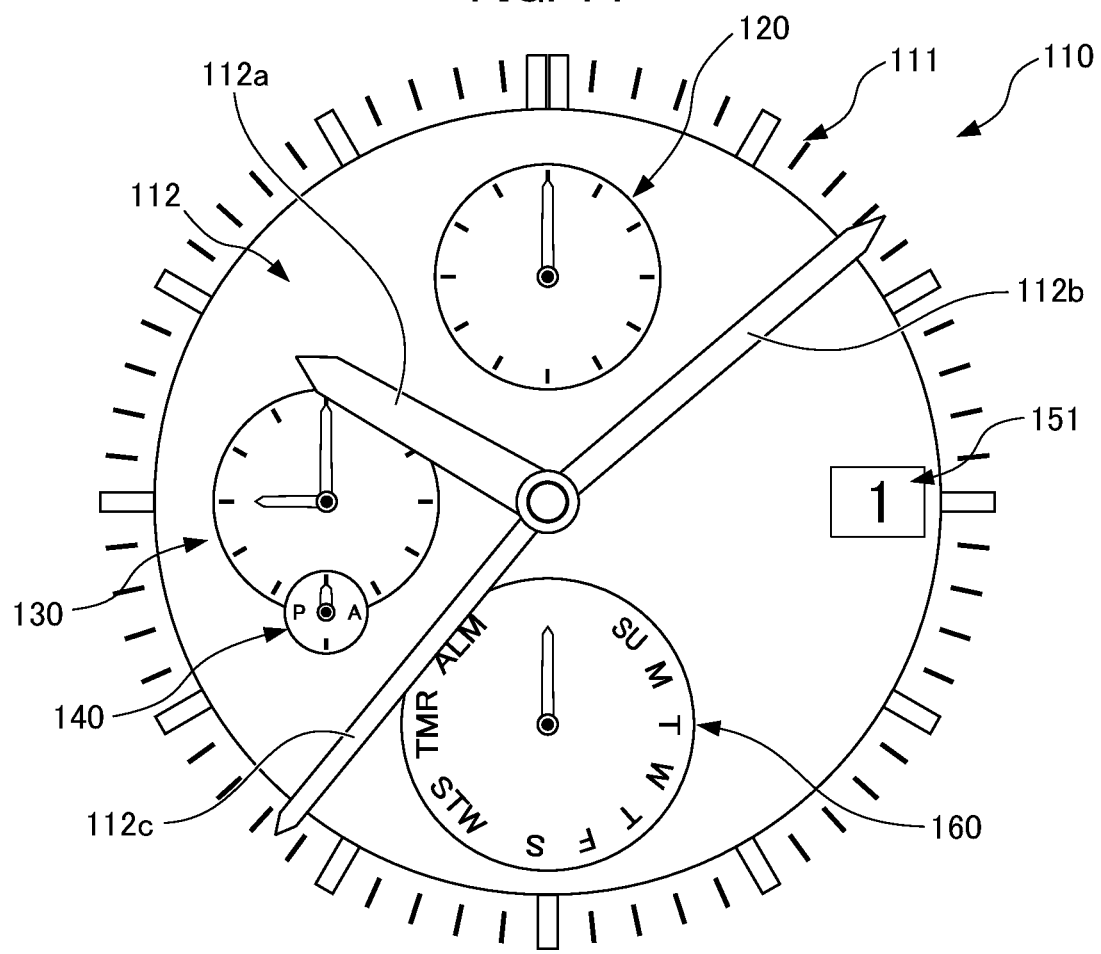
FIG. 14 is a schematic diagram showing a board surface image corresponding to the timepiece of FIG. 1.

In the management server 10, the common component images shown in FIGS. 6 to 10 and 12 are placed based on the determined placement for the sub display boards indicating time other than the function display boards, and the component images created for each timepiece are read from the storage unit 16 and placed for the function display boards, and the board surface image 110 simulating the timepiece 200 as shown in FIG. 14 is generated.

The management server 10 generates the operation screen 100 by placing the further generated board surface image 110 and other component images such as buttons for operation. In this way, the management server 10 can generate the operation screen 100 for the hand correction processing of the stored timepiece 200 by the administrator performing the input operation of the placement information and the component images on the hands and the sub board surfaces of the timepiece 200.

Figures 15, 16:
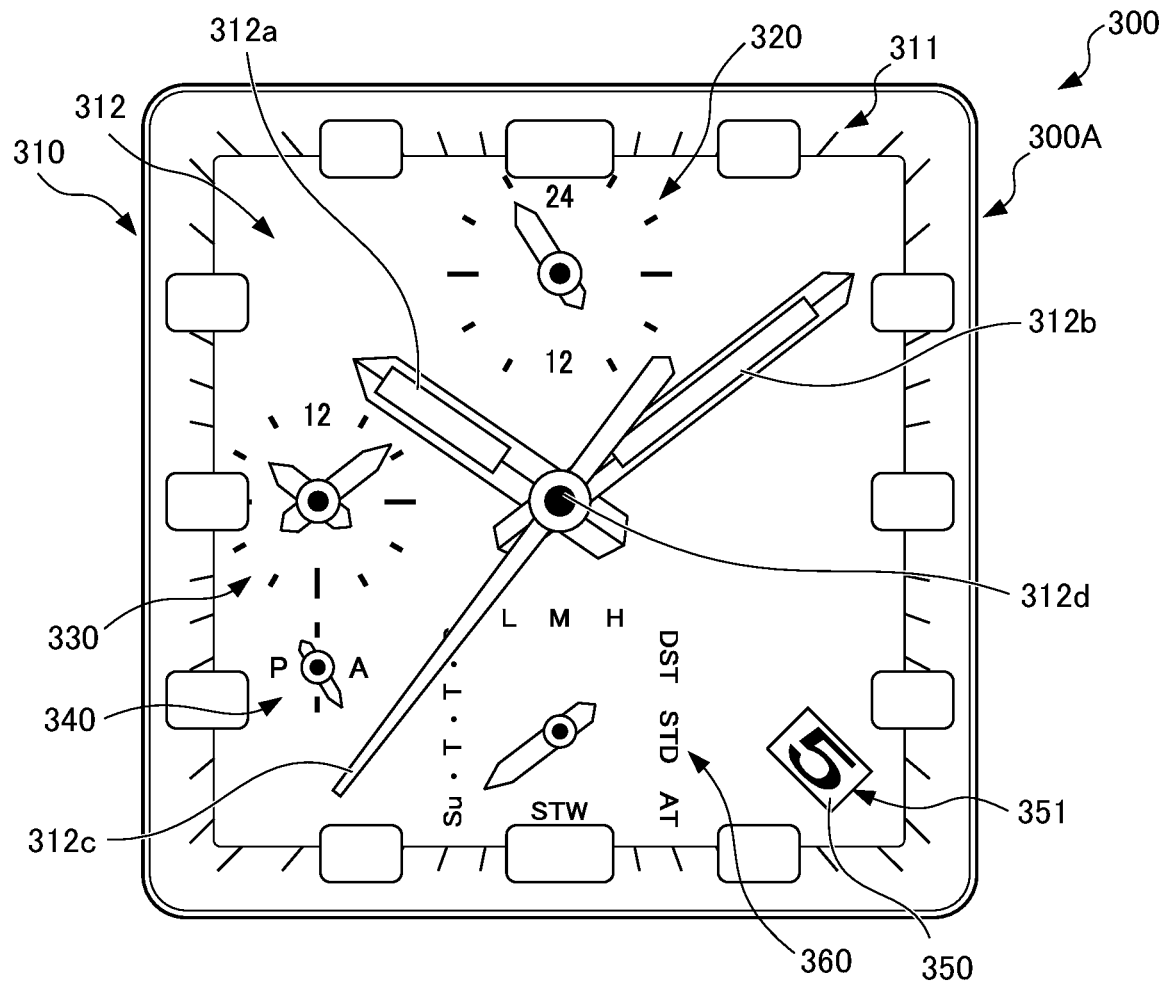
FIG. 15 is a schematic diagram showing a timepiece as another example of the pointer correction target.
FIG. 16 is a schematic diagram showing an example of a data table of component information relating to the timepiece of FIG. 15.

In addition, the management server 10 according to the present embodiment can similarly generate the operation screen 100 for another timepiece 300 having a different shape of the board surface, a different placement of the sub board surfaces, and a different type of the function display board shown in FIG. 15. The timepiece 300 includes a hour hand 312*a*, a minute hand 312*b*, a second hand 312*c*, a 24-hour meter 320, a small clock 330, a 24-hour meter 340, a function display board 260, and a date window 351 on a board surface 300A. The board surface 300A has a substantially quadrangular shape; whereas, the board surface image 110 has a circular shape.

In the management server 10, an administrator performs an input operation of the placement information and the component images on each hand and each sub board surface of the timepiece 300, and stores the information in the data table of the component information in the storage unit 16 shown in FIG. 1. When the storage unit 16 of the management server 10 stores the component information of the timepiece 300, the management server 10 starts the operation screen generation processing.

As described above, the base image 111 and the main hand image 112 are determined to be placed such that their centers coincide with the origin as the center of the board surface image 110. With respect to the 24-hour meter 320, the small clock 330, the function display board 260, and the date window 351, as described above, the positions of the 24-hour meter image 120, the small clock image 130, the function display board image 160, and the date window image 151 in the coordinates on the board surface image 110 are specified and the placement thereof is determined based on the angle and the distance magnification in the data table shown in FIG. 16.

In the data table shown in FIG. 16, an angle of DT180° and a distance magnification of DT×1.5 are inputted for the small 24-hour meter 340. Therefore, the placement of the small 24-hour meter image 140 is determined such that the center of the small 24-hour meter image 140 coincides with the position where the small 24-hour meter image 140 is 1.5 times the radius of the circle of the outline from the center of the small clock image 130 and a position where the small 24-hour meter image 140 is rotated about the center of the small clock image 130 by 180° clockwise from the direction directly above the center of the small clock image 130.

Figure 17:
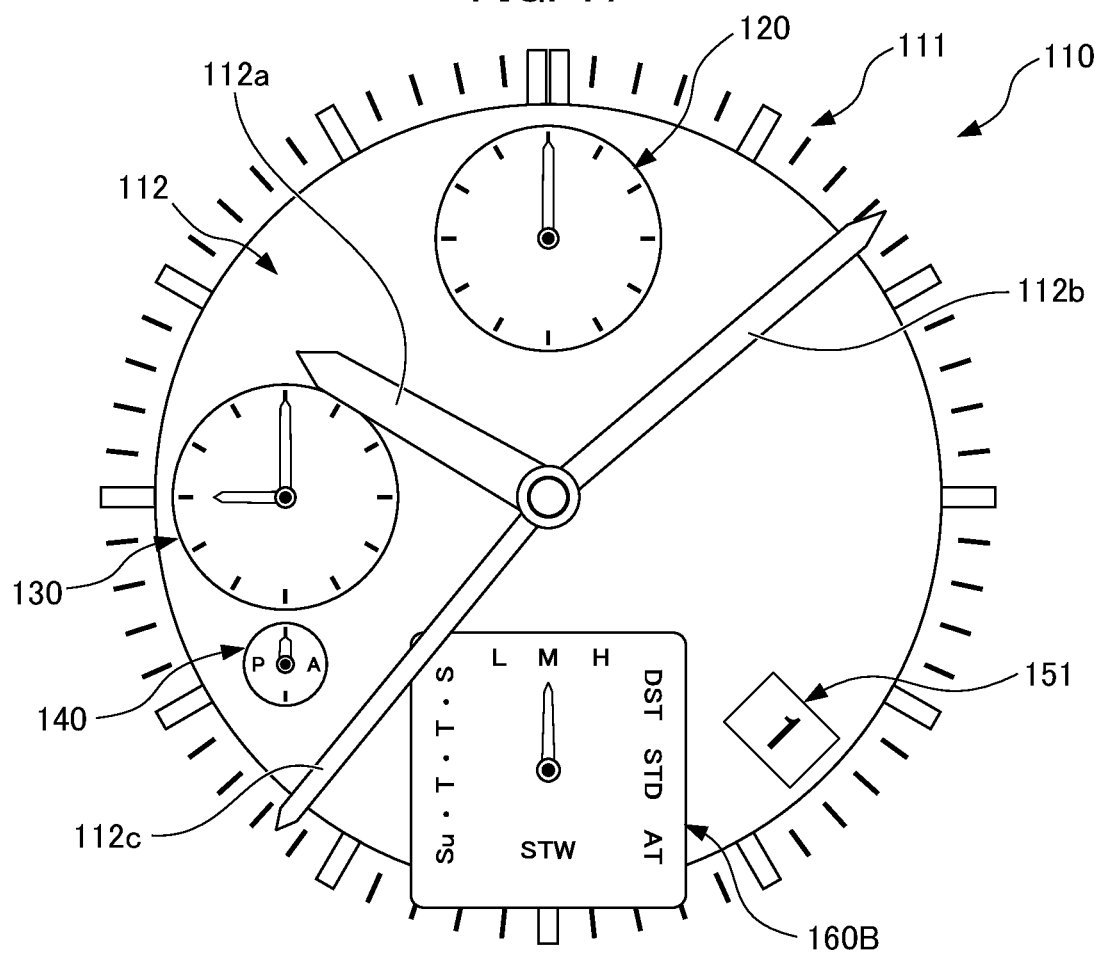
FIG. 17 is a schematic diagram showing a board surface image corresponding to the timepiece of FIG. 15.

In the management server 10, the common component images shown in FIGS. 6 to 10 and 12 are placed based at the determined placements, and for the function display board, the component images created for each timepiece are read from the storage unit 16 and placed, and the board surface image 110 simulating the timepiece 300 as shown in FIG. 17 is generated. The management server 10 generates the operation screen 100 by placing the further generated board surface image 110 and other component images such as buttons for operation. In FIG. 17, a function display board image 160B and the base image 111 are displayed so as to partially overlap each other. That is, the function display board image 160B appears on the base image 111. Even in such a state, since the placement relationship is reproduced on the operation screen 100, the user can sufficiently grasp the placement of the sub board surface such as the function display board 360 on the board surface 300A of the timepiece 300 as an operation target in the board surface image 110.

Thus, in the management server 10, even when the placement and shape of the sub board surfaces of the timepiece 200 as shown in FIG. 1 and the timepiece 300 as shown in FIG. 15 are different, the administrator can automatically generate the operation screen 100 inputted in relation to the timepiece 300 by performing the input operation of the placement information and the image for each hand and each sub board surface of the timepiece 300.

In the present embodiment, with respect to the function display board, a component image of a dedicated sub board surface is generated for each type of timepiece and stored in the storage unit 16 of the management server 10. In the function display board, the position of the pointer shaft, the movable range of the pointer, the number of steps, and the like are also set by a table of parameters (not shown) included in the component information of the storage unit 16. The number of steps indicates the number of times the pointer moves in one cycle. One cycle of the functional hand corresponds to the movable range of the above-described pointer.

Figure 18:
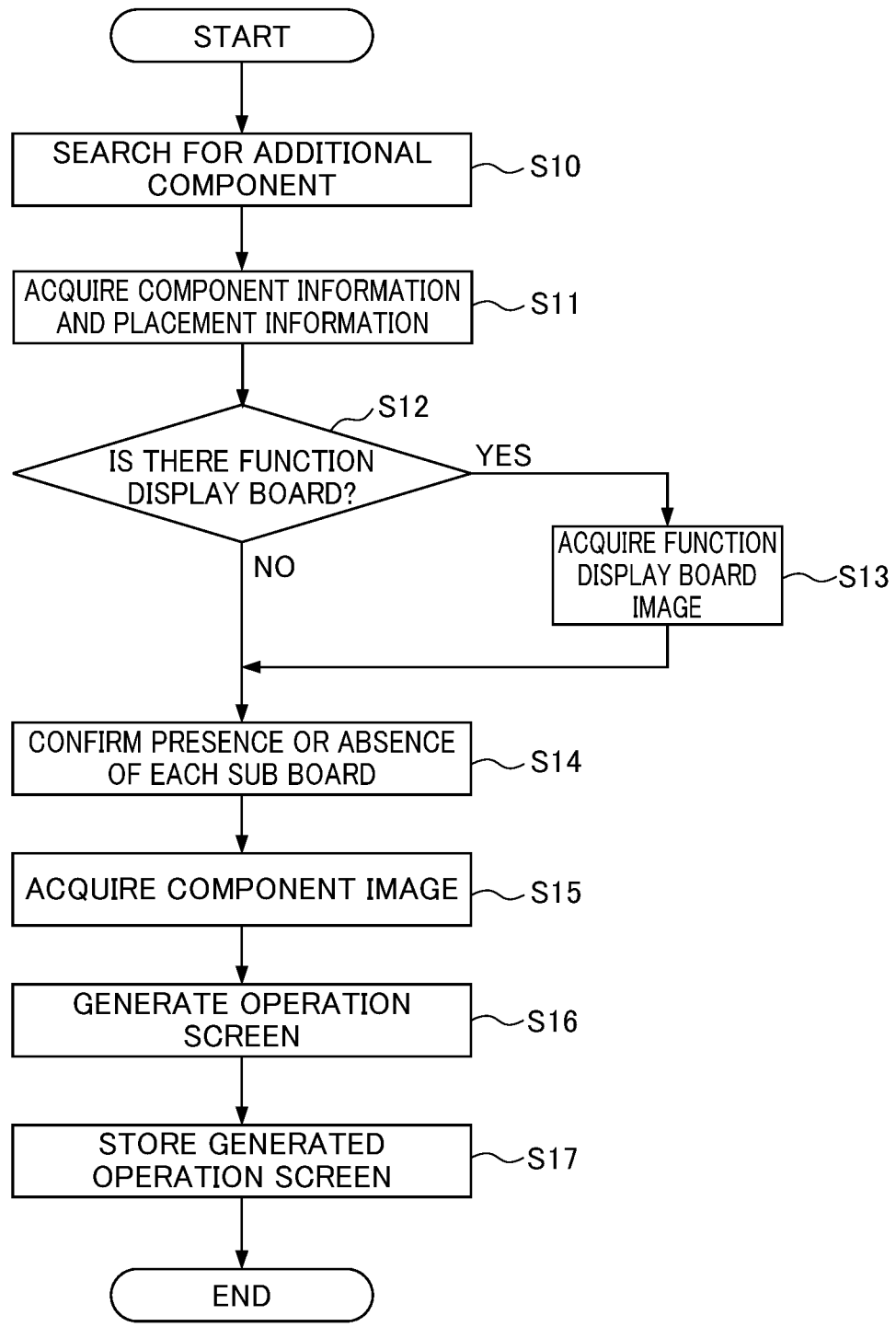
FIG. 18 is a flowchart illustrating operation screen generation processing executed by the management server shown in FIG. 2 having the functional configuration shown in FIG. 3.

Next, the operation screen generation processing will be described with reference to a flowchart shown in FIG. 18. The operation screen generation processing is directed to a screen for a user to operate at the time of the pointer correction processing in the user terminal 1. When the operation screen generation process is executed, as shown in FIG. 2, the component information acquisition unit 34, the placement information acquisition unit 35, the operation screen generation unit 36, and the operation screen management unit 37 function in the processor 11. The operation screen generation processing is started when the input processing unit 33 receives an input operation by the administrator of the management server 10 to store the component information of the timepiece 200 of a new type in the data table of the component information of the storage unit 16.

First, the operation screen management unit 37 searches the database of the component information stored in the storage unit 16 for the component information of the added timepiece 200 (step S10). Next, the component information acquisition unit 34 acquires the component information of the added timepiece 200, and the placement information acquisition unit 35 acquires placement information of the added timepiece 200 (step S11). In other words, the management server 10 executes the acquisition step of acquiring the component information comprising at least one component, the component being provided on the board surface 200A of the timepiece 200, which points a symbol indicating certain information or displays the certain information, and the placement information indicating the position of the component information on the board surface 200A.

Next, the operation screen generation unit 36 confirms the presence or absence of a function display board from the component information of the added timepiece 200 (step S12). If the added timepiece 200 has a function display board (step S12: YES), the operation screen generation unit 36 acquires a function display board surface image of the timepiece 200 from the storage unit 16 based on the component information (step S13), and the processing proceeds to step S14. If there is no function display board in the added timepiece 200 (step S12: NO), the processing proceeds to step S14.

Next, the operation screen generation unit 36 confirms the presence or absence of each sub board surface from the component information of the added timepiece 200 (step S14). Next, based on the component information, the operation screen generation unit 36 acquires the component image of the sub board surface other than the function display board of the timepiece 200 from the storage unit 16 (step S15).

Next, the operation screen generation unit 36 generates a board surface image based on the component image of the acquired sub board surface and the placement information, and generates an operation screen in which the further generated board surface image and other images are placed (step S16). That is, the management server 10 executes a generation step of identifying, based on the placement information, the position on the image of at least one selected from the 24-hour meter image 120, the small clock image 130, the small 24-hour meter image 140, the date window image 151, and the function display board image 160 corresponding to the component information, and generating the board surface image 110 for operation used when the user terminal 1 operates the timepiece 200. Next, the operation screen management unit 37 stores the generated operation screen in the database of the storage unit 16 (step S17), and ends the processing.

Before transmitting the operation screen 100 including the board surface image 110 to the user terminal 1, the management server 10 receives an operation screen transmission request from the user terminal 1 and information on the type of the timepiece used by the user. The management server 10 selects necessary component information from the storage unit 16 based on the information on the type of the timepiece. The management server 10 reads the operation screen 100 stored in the database of the storage unit 16 based on the selected component information, and transmits the operation screen 100 to the user terminal 1. The operation screen transmission request includes information on the type of the timepiece as an operation target during short-range communication. In addition, the operation screen transmission request is not limited to the information on the types of the timepiece as an operation target during the short-range communication, and may be information on the type of all types of timepieces registered by the user in the user terminal 1. In other words, the board surface image 110 to be transmitted to the user may be of all models registered in the user terminal 1 by the user, or may be transmitted only by a timepiece currently connected by Bluetooth Low Energy (Registered Trademark) (BLE). The management server 10 searches the storage unit 16 from the information on the type of the timepiece as an operation target included in the operation screen transmission request, specifies the operation screen 100 of the timepiece as an operation target, and transmits the operation screen 100 to the user terminal 1.

Furthermore, the timepiece as an operation target itself may have information on the placement of the board surface image 110. In this case, when the timepiece is connected to the user terminal 1 by the BLE, the user terminal 1 transmits the placement information of the board surface image 110 read from the timepiece to the management server 10, and the management server 10 transmits the operation screen 100 including the board surface image 110 to the user terminal 1 based on the sent placement information. In a case of a configuration in which the user terminal 1 generates the operation screen, the management server 10 searches the storage unit 16 from the information about the type of the timepiece as an operation target included in the operation screen transmission request, identifies the placement information, the component information, and the component image of the timepiece as an operation target, and transmits the information to the user terminal 1.

The management server 10 configured as described above includes the control unit 30 configured to execute processing including: acquiring the component information comprising at least one selected from the 24-hour meter 220, the small clock 230, the 24-hour meter 240, the date window 251, and the function display board 260, being provided on a board surface of a timepiece, which points a symbol indicating certain information or displays the certain information, and the component image such as the 24-hour meter image 120 or the small clock image 130 or the 24-hour meter image 140 or the date window image 151 or the function display board image 160 corresponding to the component information; and setting a component image common to a plurality of types of timepieces 200 by associating the component information with the plurality of types of the timepieces 200.

With such a configuration, since the component image indicating the component placed on the board surface 200A of the plurality of types of the timepieces 200 can be shared and managed, the number of component images corresponding to the components can be reduced, and the management of the component images can be efficiently performed.

Furthermore, the control unit 30 is configured to further execute processing including: acquiring function board information indicating a function board including a functional hand provided on the board surface 200A of the timepiece 200, and the function display board image 160 corresponding to the function board information; and specifying the timepiece to which the function display board image 160 is applied by associating the function board information with a portion of the plurality of types of timepieces 200. The portion of the plurality of types of the timepieces 200 may be one or a plurality of timepieces. For example, the function display board image 160 may be associated with each timepiece 200, or the function display board images 160 of a group of the timepieces 200 may be shared.

With such a configuration, component images corresponding to components whose specifications do not change significantly can be shared, and function display board images corresponding to function boards whose specifications change largely for each timepiece can be handled individually. It is possible to improve the maintenance performance of the application and to reduce the amount of information possessed by the management server 10 while effectively enhancing the reproducibility of the timepiece 200 by the function display board image 160 in which the impression largely changes.

Furthermore, the control unit 30 is configured to further execute processing including associating the component information with the placement information indicating the position of the component information on the board surface 200A.

With such a configuration, it is possible to generate and place the component image of the sub board surface automatically by causing the management server 10 to acquire the component information of the board surface image 110 for operation which has been generated by the management server 10 by the administrator every time a new type of timepiece is available, and thus, it is possible to reduce the labor for generating the image of the administrator.

Furthermore, the placement information includes, with the rotation center of the pointer provided at the center of the board surface 200A and rotating in the two-way direction as an origin, the distance magnification between the origin and the 24-hour meter 220 or the small clock 230 or the 24-hour meter 240 or the date window 251 or the function display board 260, and the angle between a predetermined reference direction from the origin and a direction from the origin to the 24-hour meter 220 or the small clock 230 or the 24-hour meter 240 or the date window 251 or the function display board 260.

With such a configuration, the management server 10 according to the present embodiment can express the position of the component as polar coordinates, and can reduce the amount of information possessed in comparison with a case where the position is represented by three real numbers in Cartesian coordinates. Furthermore, since there are many types of screen sizes of the user terminal 1, the operation screen may be enlarged or reduced in accordance with the screen size. When performing enlargement and reduction of the operation screen, the management server 10 only needs to multiply the magnification of the distance information as compared with multiplying the magnification of the three-axis values by the magnification of the enlargement and reduction as in the case of Cartesian coordinates, and therefore, the amount of calculation can be reduced.

Furthermore, the component information includes the interlocking component information relating to the component such as the 24-hour meter 220, the small clock 230, the 24-hour meter 240, the date window 251, and the function display board 260 which points a symbol indicating certain information or displays the certain information, and the component changes in conjunction with a change in one other component which points a symbol indicating certain information or displays the certain information.

With such a configuration, the administrator of the management server 10 inputs the interlocking component information into the management server 10, whereby the interlocking component is set for a plurality of components that are automatically interlocked and rotated, and therefore, the board surface image can be generated more efficiently.

It should be noted that the present disclosure is not limited to the above-described embodiments, and variations, improvements, and the like within a range capable of achieving the purpose of the present disclosure are included in the present disclosure.

In the above-described embodiments, the center of the circle of the outline of the board surface image 110 is set to the origin, the direction directly above from the origin is set to 0', the radius of the circle is set to 1, and the clockwise direction is set to positive, and the angle and the distance magnification that is the ratio of the distance from the origin to the radius of the circle represent the position on the board surface as polar coordinates. However, the present disclosure is not limited thereto. For example, the position on the board surface may be represented by Cartesian coordinates with the center of the circle of the outline of the board surface image 110 as the origin, the left-right direction of the center of the circle as the x-axis, and the up-down direction as the y-axis.

Furthermore, in the above-described embodiments, the management server 10 to which the present disclosure is applied is described as an example of a server. For example, the present disclosure can be applied generally to electronic devices having an operation screen generation processing function. More specifically, for example, the present disclosure can be applied to a personal computer, a portable terminal such as a smartphone or a tablet terminal, or a wearable terminal such as a smart watch.

Further, in the above-described embodiments, the management server 10 specifies the position of the component image corresponding to the component information on the image based on the placement information, and generates the board surface image 110 for operation to be used when the user terminal 1 operates the timepiece 200. However, the present disclosure is not limited thereto. For example, instead of transmitting the operation screen 100 to the user terminal 1 when the user terminal 1 executes the pointer correction processing, the management server 10 may transmit component information including component information, placement information, and component images such as a sub board surface and a pointer to the user terminal 1, and cause the user terminal 1 to generate the operation screen based on the received component information.

In the above-described embodiment, the placement information is stored in the storage unit 16 of the management server 10. However, the present disclosure is not limited thereto. For example, the placement information may be possessed by the user terminal 1 or the timepiece 200. Here, when the timepiece 200 has the placement information, the user terminal 1 may transmit the placement information read by the user terminal 1 from the timepiece 200 to the management server 10 at the timing when the timepiece 200 and the user terminal 1 start short-range communication. In this case, the management server 10 generates a board surface image based on the transmitted placement information and further generates an operation screen, and transmits the operation screen to the user terminal 1.

Furthermore, in the above-described embodiments, the management server 10 transmits the operation screen 100 generated in advance and stored in the storage unit 16 to the user terminal 1 at the timing when the management server 10 receives the operation screen transmission request from the user terminal 1. However, the present disclosure is not limited thereto. The management server 10 may include a specific information acquisition unit that acquires specific information as model information of the timepiece from an external terminal, and the management server 10 may acquire the specific information transmitted from the user terminal 1 by the specific information acquisition unit, and may acquire the component information indicating the 24-hour meter 220 or the small clock 230 or the 24-hour meter 240 or the date window 251 or the function display board 260 provided on the board surface 200A of the timepiece 200, and the placement information indicating the position of the component information on the board surface 200A based on the specific information.

Furthermore, the management server 10 does not need to store all the component information and, for example, the management server 10 may store only the component image and the parameter of the sub board surface of the function hand, and the user terminal 1 may store the component information excluding the component image and the parameter of the sub board surface and the pointer except the function display board.

The processing sequence described above can be executed by hardware, and can also be executed by software. In other words, the functional configuration of FIG. 3 is merely an illustrative example, and the present disclosure is not particularly limited thereto. More specifically, the types of functional blocks employed to realize the above-described functions are not particularly limited to the examples shown in FIG. 3, so long as the Management server 10 can be provided with the functions enabling the aforementioned processing sequence to be executed in its entirety. In addition, a single functional block may be configured by a single piece of hardware, a single installation of software, or a combination thereof.

In the case of having the series of processing executed by software, the program constituting this software is installed from a network or recording medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium distributed separately from the device main body for supplying the program to a user, but also can be constituted by a storage medium or the like supplied to the user in a state incorporated in the device main body in advance. The removable medium is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 2 in which the program is recorded or a hard disk included in the storage unit 16 of FIGS. 2, etc.

It should be noted that, in the present specification, the steps defining the program recorded in the storage medium include not only the processing executed in a time series following this order, but also processing executed in parallel or individually, which is not necessarily executed in a time series.

The embodiments of the present disclosure described above are only illustrative, and are not to limit the technical scope of the present disclosure. The present disclosure can assume various other embodiments. Additionally, it is possible to make various modifications thereto such as omissions or replacements within a scope not departing from the spirit of the present disclosure. These embodiments or modifications thereof are within the scope and the spirit of the invention described in the present specification, and within the scope of the invention recited in the claims and equivalents thereof.

What is claimed is:

1. A remote information processing system comprising:
    a communication unit configured to communicate with at least one user terminal;
    a memory that stores programs; and
    at least one processor configured to execute the programs stored in the memory,
    wherein the processor is further configured to execute processing including:
        acquiring, based on information relating to a type of a timepiece of a user, component information stored in a storage unit, the component information including information relating to a pointer cooperating with a timepiece board surface image or a display component in which a display content changes, a component image corresponding to the component information, and placement information indicating a position of the component image on the timepiece board surface image,
        associating the component information with a plurality of types of timepieces to set the component image which is common to the plurality of types of timepieces, and
        transmitting, to the at least one user terminal via the communication unit, the component information, the component image, and the placement information corresponding to information relating to the type of the timepiece of the user.

2. The remote information processing system according to claim 1, wherein the processor is configured to further execute processing including:
    acquiring function display board information including a type of a function display board including a functional hand provided on the timepiece board surface image, and a function display board image corresponding to the function display board information; and
    associating the function display board information with a portion of the plurality of types of timepieces to specify the type of timepiece to which the function display board image is applied.

3. The remote information processing system according to claim 1, wherein the placement information includes:
    when defining a center of the timepiece board surface image as a first origin and defining a center of the component image as a second origin, distance information relating to a distance between the first origin and the second origin, and angle information including an angle between a predetermined reference direction from the first origin and a direction from the first origin to the second origin.

4. The remote information processing system according to claim 3, wherein the placement information includes:
when defining a center of a component image smaller than the component image as a third origin, distance information relating to a distance between the second origin and the third origin, and angle information including an angle between the predetermined reference direction from the second origin and a direction from the second origin to the third origin.

5. The remote information processing system according to claim 1,
wherein the component information includes interlocking component information relating to a pointer or a display component that changes in conjunction with a change in another component or another display component.

6. A non-transitory computer-readable storage medium storing a program that is executed by a computer, the computer comprising a processor configured to control a remote information processing system comprising a communication unit configured to communicate with at least one user terminal, the program being executable to cause the computer to perform operations comprising:
acquiring, based on information relating to a type of a timepiece of a user, component information stored in a storage unit, the component information including information relating to a pointer cooperating with a timepiece board surface image or a display component in which a display content changes, a component image corresponding to the component information, and placement information indicating a position of the component image on the timepiece board surface image,
associating the component information with a plurality of types of timepieces to set the component image which is common to the plurality of types of timepieces, and
transmitting, to the at least one user terminal via the communication unit, the component information, the component image, and the placement information corresponding to information relating to the type of the timepiece of the user.

7. The non-transitory computer-readable storage medium according to claim 6, wherein the processor is configured to further execute processing including:
acquiring function display board information including a type of a function display board including a functional hand provided on the timepiece board surface image, and a function display board image corresponding to the function display board information; and
associating the function display board information with a portion of the plurality of types of timepieces to specify the type of timepiece to which the function display board image is applied.

8. The non-transitory computer-readable storage medium according to claim 6, wherein the placement information includes:
when defining a center of the timepiece board surface image as a first origin and defining a center of the component image as a second origin, distance information relating to a distance between the first origin and the second origin, and angle information including an angle between a predetermined reference direction from the first origin and a direction from the first origin to the second origin.

9. The non-transitory computer-readable storage medium according to claim 8, wherein the placement information includes:
when defining a center of a component image smaller than the component image as a third origin, distance information relating to a distance between the second origin and the third origin, and angle information including an angle between the predetermined reference direction from the second origin and a direction from the second origin to the third origin.

10. The non-transitory computer-readable storage medium according to claim 6,
wherein the component information includes interlocking component information relating to a pointer or a display component that changes in conjunction with a change in another component or another display component.

11. A component management method that causes a remote information processing system comprising a communication unit configured to communicate with at least one user terminal to manage components, the component management method comprising:
acquiring, based on information relating to a type of a timepiece of a user, component information stored in a storage unit, the component information including information relating to a pointer cooperating with a timepiece board surface image or a display component in which a display content changes, a component image corresponding to the component information, and placement information indicating a position of the component image on the timepiece board surface image,
associating the component information with a plurality of types of timepieces to set the component image which is common to the plurality of types of timepieces, and
transmitting, to the at least one user terminal via the communication unit, the component information, the component image, and the placement information corresponding to information relating to the type of the timepiece of the user.

12. The component management method according to claim 11, further comprising:
acquiring function display board information indicating including a type of a function board including a functional hand provided on the timepiece board surface image, and a function display board image corresponding to the function display board information; and
associating the function display board information with a portion of the plurality of types of timepieces to specify the timepiece to which the function display board image is applied.

13. The component management method according to claim 11, wherein the placement information includes:
when defining a center of the timepiece board surface image as a first origin and defining a center of the component image as a second origin, distance information relating to a distance between the first origin and the second origin, and angle information including an angle between a predetermined reference direction from the first origin and a direction from the first origin to the second origin.

14. The component management method according to claim 13, wherein the placement information includes:
when defining a center of a component image smaller than the component image as a third origin, distance information relating to a distance between the second origin and the third origin, and angle information including an angle between the predetermined reference direction from the second origin and a direction from the second origin to the third origin.

15. The component management method according to claim 11, wherein the component information includes interlocking component information relating to a pointer or a display component that changes in conjunction with a change in another component or another display component.

16. A user terminal comprising:

a communication unit configured to communicate with a remote information processing system, the remote information processing system being configured to:

acquire, based on information relating to a type of a timepiece of a user, component information stored in a storage unit, the component information including information relating to a pointer cooperating with a timepiece board surface image or a display component in which a display content changes, a component image corresponding to the component information, and placement information indicating a position of the component image on the timepiece board surface image, and associate the component information with a plurality of types of timepieces to set the component image which is common to the plurality of types of timepieces; and a processing unit configured to generate an operation screen including the timepiece board surface image based on the component information, the component image, and the placement information corresponding to information relating to the type of the timepiece of the user that is received by the communication unit from the remote information processing apparatus and that is transmitted in advance by a host device via the communication unit to the remote information processing apparatus.

17. The user terminal according to claim 16, wherein the operation screen includes at least one button for a correction operation that allows the user to rotate a pointer serving as a correction target while displaying the timepiece board surface image corresponding to the type of the timepiece of the user on the user terminal.

18. The user terminal according to claim 17, wherein the operation screen displays the at least one button for the correction operation in a state in which the pointer as the correction target on the timepiece board surface image corresponding to the type of the timepiece of the user is moved to a predetermined reference position.

* * * * *